United States Patent [19]
Christopher

[11] Patent Number: 4,481,429

[45] Date of Patent: Nov. 6, 1984

[54] BIAS SUPPLY FOR A.C. LINE POWERED APPARATUS

[75] Inventor: Todd J. Christopher, Indianapolis, Ind.

[73] Assignee: RCA Corporation, New York, N.Y.

[21] Appl. No.: 379,094

[22] Filed: May 17, 1982

[51] Int. Cl.³ .......................... H03K 3/26; H04N 3/18
[52] U.S. Cl. ................... 307/296 R; 363/34; 358/190; 328/262
[58] Field of Search ............. 307/296 R; 328/262, 328/263; 358/190; 363/34, 35, 89

[56] References Cited

U.S. PATENT DOCUMENTS

| | | | |
|---|---|---|---|
| 3,702,969 | 11/1972 | Maillot | 328/262 |
| 4,097,899 | 6/1978 | Yu | 358/181 |
| 4,321,514 | 3/1982 | Thibodeau et al. | 358/190 |
| 4,331,978 | 5/1982 | Nowaczyk | 358/190 |

*Primary Examiner*—Stanley D. Miller
*Assistant Examiner*—B. P. Davis
*Attorney, Agent, or Firm*—E. M. Whitacre; P. J. Rasmussen; R. G. Coalter

[57] ABSTRACT

Direct current isolation and A.C. power line voltage reduction are provided in a first D.C. power supply by means of transformer coupling and in a second D.C. power supply by means of capacitor coupling which, additionally, provides suppression of differential mode and common mode components of high frequency noise or RF signals which may be present on the A.C. power line. The primary winding in the transformer coupled supply is switched and the D.C. output voltages produced by the supplies are combined to form a resultant bias signal of a first polarity and having relatively high current capability when the switch is closed, the bias signal being of a second polarity and having relatively limited current capability when the switch is open whereby high A.C. to D.C. conversion efficiency is achieved for either condition of the power switch. In a representative application of the bias supply, the first supply provides operating power for a video disc player and the bias signal controls the player antenna transfer switch.

10 Claims, 1 Drawing Figure

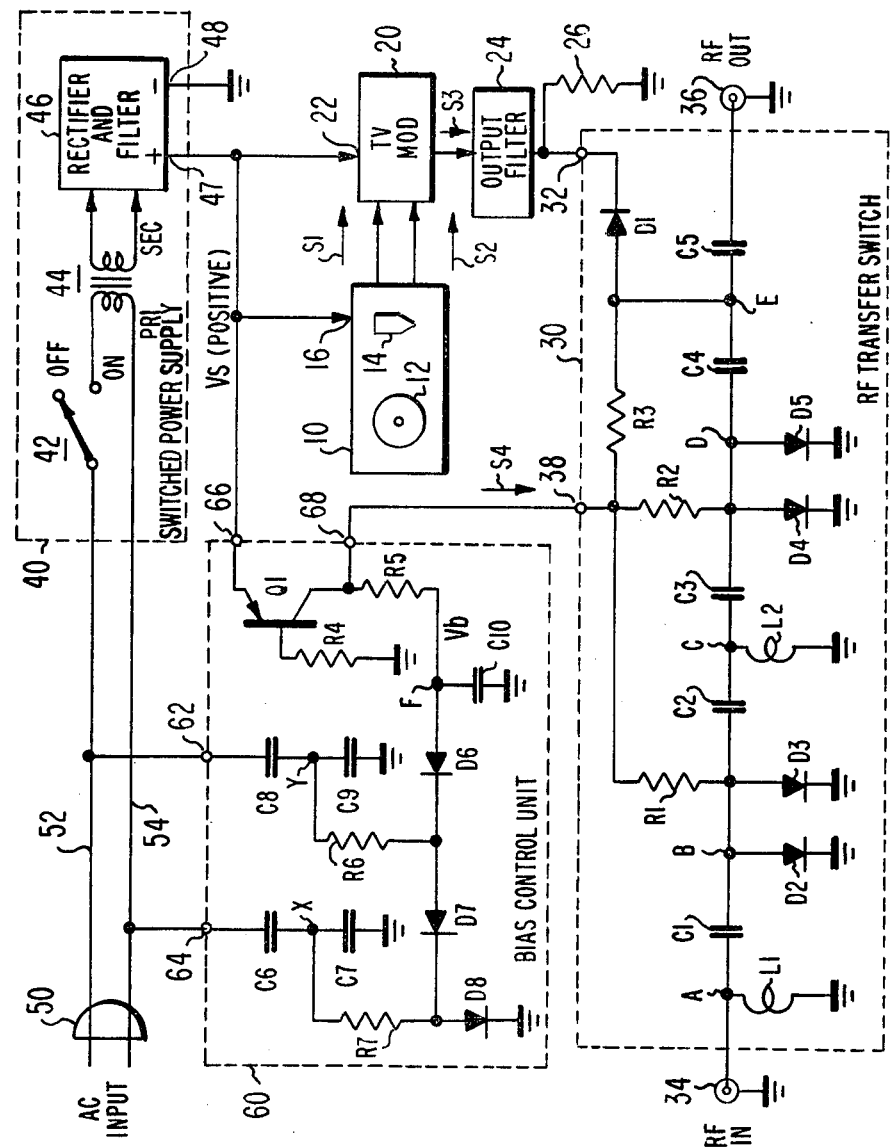

BIAS SUPPLY FOR A.C. LINE POWERED APPARATUS

This invention relates to electrical apparatus and particularly to power supplies for use in such apparatus.

In a known form of power supply for an A.C. line powered electronic instrument, a power transformer is used to provide the function of voltage reduction and D.C. isolation between the A.C. power line and ground referenced circuits of the instrument. It is desirable to connect a power switch in the primary circuit of the power transformer to avoid power consumption (due to transformer exciting losses) when the instrument is turned off. Switching of the transformer primary circuit, however, precludes use of the transformer secondary winding for providing a source of D.C. bias when the instrument is turned off. Such bias could be used for various purposes such as retention of data in a volatile memory, powering time-keeping circuits, or maintaining electronic switches in a desired state. One might consider using a battery as a source of D.C. bias in such an instrument, but batteries suffer certain disadvantages. Primary cells, for example, require replacement at regular intervals and secondary cells require charging circuits and are relatively inefficient sources of energy.

The present invention is directed to meeting the need for a bias supply suitable for use in A.C. line powered apparatus, which features improved efficiency which provides power line isolation, which requires essentially no service or maintenance and which additionally provides suppression of common mode and differential mode high frequency noise or RF signal components which may be present on the A.C. supply lines.

A bias supply embodying the invention is intended for use with A.C. line powered apparatus and includes a pair of A.C. supply lines for connection to a source of A.C. power and a first D.C. supply means having input means coupled to the supply lines via a power switch and output means for providing a first D.C. output voltage when the power switch is closed. A second D.C. supply means includes input means continuously coupled to the supply lines and output means for providing a second D.C. output voltage, the input means of the second supply having an input impedance characteristic which varies inversely with frequency. Circuit means are provided for selectively coupling the first and second D.C. output voltages to an output terminal for providing a bias output signal thereat.

In the drawing, the sole FIGURE is a circuit diagram, partially in block form, of a video disc player embodying the invention.

The illustrated video disc player includes a signal recovery unit 10 comprising a turntable 12 for rotating a video disc record, a pickup transducer 14 for recovering information signals from the record and processing circuits (not shown) for deriving baseband audio and video output signals, S1 and S2, from the recovered information signals where a record is being played. The recovery unit also includes an input 16 coupled to receive a source of positive supply voltage, Vs, for the powering the signal processing circuits when the player is in operation. Such recovery units are well known in the art.

The baseband signals S1 and S2 are applied to the sound and picture modulation input terminals of a television modulator 20 which has a power input terminal 22 coupled to receive the D.C. supply voltage Vs. When Vs is present, unit 10 produces the baseband signals S1 and S2 and modulator 20 provides an RF output signal, S3, within a selected television broadcast band and having sound and picture components modulated by the baseband signals.

The RF signal S3 is applied to an output filter 24 to confine the spectrum of the signal to a desired broadcast standard (e.g., NTSC, PAL, SECAM etc). U.S. Pat. No. 4,097,899 of J. P. Yu describes a "transmitter" and vestigial sideband filter suitable for use as modulator 20 and filter 24. The Yu filter includes a D.C. path to ground in its output circuit. Another suitable modulator and output filter is described in the U.S. patent application of R. E. Hunter, Jr., entitled "TV INTERFACE RF MODULATION CIRCUITRY" Ser. No. 253,012 which was filed Apr. 10, 1981. The Hunter output filter does not include a D.C. path to ground at its output but such a path may be obtained by terminating the filter with a resistor 26 (or other suitable direct current conductive element) as shown. As will be explained in detail subsequently, the use of a modulator of the type having an RF output filter with a D.C. path to ground (or some other suitable reference potential point) facilitates application of turn-on and turn-off bias to a semiconductor device in the RF transfer switch (30) of the apparatus.

The output of filter 24 is coupled to an RF input terminal 32 of an RF transfer switch 30 which selectively couples terminal 32 and an RF input connector 34 to an RF output connector 36 in accordance with the state of a bipolar control signal S4 applied to a control terminal 38 of the switch. The term "bipolar", as used herein, means that the signal S4 has two possible polarities or "states" taken with respect to a reference ground potential point. When signal S4 is positive, a first circuit path is completed between terminal 32 and connector 36 and a second circuit path between connectors 34 and 36 is interrupted. Conversely, when signal S4 is negative (with respect to ground) the first ciruit path is interrupted and the second path is completed. Connector 34 is provided to receive an RF input signal from a suitable source such as an antenna, a video tape player or the like, and connector 36 is provided for connection to a utilization device such as a television receiver or some other suitable device.

Turning now to the details of switch 30, the second circuit path referred to includes a high pass filter comprising five capacitors, (C1-C5), connected in series, in that order, between connectors 34 and 36. An inductor, L1, is connected between ground and the input node "A" of the high pass filter (i.e., RF connector 34). An inductor, L2, is connected between an internal node "C" of the filter and ground. Node "C" corresponds to the common connection of capacitors C2 and C3. The odd numbered capacitors (C1, C3 and C5) are not part of the frequency determining elements of the filter but are included to provide the function of D.C. blocking to facilitate forward and reverse biasing of semiconductor devices in the filter.

The filter cutoff frequency is selected to be below the lowest standard TV channel broadcast frequency. In the United States of America, a suitable choice of cut-off frequency is about 40 MHz (which is less than the TV channel 2 frequency allocation but substantially higher than the frequencies assigned to standard long wave radio broadcast stations. The reasons for selecting a cut-off frequency in this range will be discussed subsequently. Suitable values for the filter elements (and the blocking capacitors) are: C1=C3=C5=0.001 microfarad; C2=C4=33 picofarads; L1=1 micro-Henry: and L2=22 micro-Henries.

The first circuit path of switch 30 comprises a series connection of capacitor C5 and a semiconductor device, diode D1. The cathode of diode D1 is connected to terminal 32 and the anode of diode D1 is connected to the common connection (node E) of capacitors C4 and C5. When diode D1 is forward biased, the first circuit path is completed (diode D1 turned on) and the RF signal S3 is coupled from input terminal 32 to the output connector 36. Conversely, when diode D1 is reverse biased, the first circuit path D1-C5 is interrupted by the turn-off of diode D1. Advantageously, the presence of reverse bias on diode D1 prevents any tendency of the diode to be turned on due to the presence any RF signal or noise signal which may be present either at terminal 32 or at node E.

The second circuit path of switch 30 includes a plurality of semiconductor switching devices (diodes D2-D5) arranged in a shunt relationship (rather than a series relationship) with the path. Specifically, diodes D2 and D3 are connected between node B and ground and diodes D4 and D5 are connected between node D and ground, each of diodes D2-D5 being poled in the same sense with respect to ground as diode D1. When forward biased, diodes D2-D5 interrupt the second circuit path by shunting any RF signal (or noise) present in the path to ground. Conversely, when reverse biased, diodes D2-D5 complete the second circuit path by turning off and thus removing the shunt path to ground. As in the case with diode D1, the presence of the reverse bias on diodes D2-D5 prevents any tendency for the diodes to turn on in response to the RF signals or noise which may be present at nodes B and D.

The use of reverse bias to minimize any tendency of diodes D2-D5 to turn on due to RF signals or noise in the second circuit path is further augmented by the high pass filter in the second circuit path. As previously mentioned, the filter element values are selected to provide a cut-off frequency below TV channel 2, but greater than that of standard long (or short) wave broadcast stations. This frequency choice greatly attenuates signals from local radio stations which may be picked up by an antenna coupled to connector 34. Such signals may be quite large and tend to counteract the reverse bias, applied to diodes D2-D5. This possibility is minimized by high pass filtering which also advantageously reduces the amount of reverse bias required keep diodes D2-D5 fully off. Thus, filtering in the second circuit path enhances the reliability of the RF switch in environments of high RF signal or noise levels.

Switch 30 is controlled by applying forward bias current to all of the diodes D1-D5 when the bipolar control signal S4 is of a given polarity (e.g., positive) and applying reverse bias to all of the diodes when signal S4 is of the opposite polarity (e.g., negative). The forward and reverse bias currents are distributed to the diodes by means of resistors R1, R2 and R3 connected between control terminal 38 and nodes B, D and E, respectively. Nodes B and D have two switching diodes each, to provide improved attenuation in the second circuit path of switch 30 when the diodes are forward biased. This is desirable for two reasons. First, when connector 34 is coupled to a TV antenna, relatively high attenuation in the second circuit path minimizes "backward radiation" of the signal S3 which otherwise might interfere with reception of TV signals. Second, when connector 34 is coupled to a high level RF signal source, relatively high attenuation in the second circuit path minimizes any tendency of the high level RF source to interfere with the signal S3.

Where the number of diodes differs at different circuit nodes (as in switch 30), it is desirable to equalize the diode junction current densities when the diodes are in a forward biased condition. This improves factors such as the uniformity and predictability of the diode conductance characteristics and the overall attenuation and transmission characteristics of the RF transfer switch. The desired equalization may be achieved by appropriately scaling the values of resistors R1-R3. As an example, in the case where diodes D1-D5 are substantially identical (e.g., all of the same type number) one may assume that they will have substantially similar junction areas. For such a case, the current density of all diodes of switch 30 will be equalized if the values of resistor R1 and R2 are selected to be about half the value of resistor R3. Illustrative values are 1500 ohms for resistor R1 and R2 and 2700 ohms for resistor R3.

It is a further feature of RF transfer switch 30 that the high pass filter in the second circuit path (the path between connectors 34 and 36) is selected to be of the inductor input type rather than of the capacitor input type. By this means, static charges which may be present on a TV antenna coupled to connector 34 are automatically discharged to ground (via inductor L1) when the connection is made thereby eliminating a potential shock hazard as well as providing a measure of protection for the RF switching diodes from excessively high voltages. If a capacitor input form of high pass filter is used instead, then it is desirable to provide a static drain for connector 34. A resistor or a radio frequency choke (RFC) would be suitable for this purpose.

The positive supply voltage, Vs, for baseband signal source unit 10 and TV modulator 20 is provided by switched power supply 40, (outlined in phantom) which includes a power on-off switch 42, a voltage step down transformer 44 and a rectifier and filter unit 46. The primary winding of transformer 44 is coupled via conductors 52 and 54 to an A.C. power input connector 50 with switch 42 connected in series with conductor 52. Connector (or power "plug") 50 is connected to an A.C. power outlet in normal use of the apparatus so that transformer 44 is energized upon closure of switch 42 and de-energized when switch 42 is opened. The secondary winding of transformer 44 is connected to the input of rectifier and filter unit 46 which converts the A.C. input voltage to a smoothed D.C. output voltage (Vs) at terminals 47 and 48. Terminal 48, (the negative output) is grounded and terminal 47 (the positive output) is connected to baseband signal source unit 10 and TV modulator 20. Accordingly, upon closure of switch 42, source 10 and modulator 20 are energized and produce the RF output signal S3 as previously explained.

The control signal S4 for RF transfer switch 30 is produced by power supply 40 in conjunction with a bias control unit 60. Whenever the supply voltage Vs is present (switch 42 closed), signal S3 is produced and unit 60 couples Vs to control terminal 38 thereby forward biasing each of diodes D1-D5. The forward bias completes the first circuit path between connector 36 and terminal 32 and interrupts the second circuit path between connectors 34 and 36 as previously explained. As a result, the signal S3 is coupled to RF output terminal 36 to the exclusion of any signal which may be present at connector 34 and may be monitored by a television receiver coupled to connector 36. Conversely, when Vs is not present (switch 42 open), unit 60 supplies a negative bias voltage (Vb) to terminal 38 thereby reverse biasing each of diodes D1-D5. The reverse bias interrupts the first circuit path and completes the second circuit path in switch 30 as previously explained. In this mode, an external signal source (e.g. an antenna, etc.) will be coupled through switch 30 for display on the receiver.

Considering now the details of unit 60, the unit includes a pair of A.C. input terminals 62 and 64 coupled to respective ones of conductors 52 and 54 continuously receiving a source of A.C. power, a D.C. input terminal 66 connected to receive the positive supply voltage Vs and an output terminal 68 connected to supply the bipolar control signal S4 to control terminal 38 of the RF transfer switch 30. Terminals 66 and 68 are connected to the emitter and collector electrodes, respectively, of a PNP transistor Q1 having a base electrode coupled to ground via a resistor R4. When the positive power supply voltage Vs is present, resistor R4 applies forward bias current to the base-emitter junction of transistor Q1 thereby turning transistor Q1 on which couples terminal 68 to terminal 66. Conversely, when supply voltage Vs is absent (i.e., at ground level), resistor R4 turns transistor Q1 off thereby decoupling terminal 66 from terminal 68. In effect, transistor Q1 provides the function of sensing the position of switch 42 to control the coupling of terminals 66 and 68. Mechanical alternatives would be to replace transistor Q1 and resistor R4 with a relay controlled by supply 40 or with an extra single pole single throw switch section added to switch 42. Such alternatives are less satisfactory in terms of cost, reliability and bulk than the use of a semiconductor switch (Q1) as shown.

The remaining elements of unit 60 comprise a source for continuously providing a negative output voltage, Vb at an output node F, and a current limiter for coupling the voltage Vb to terminal 68. The current limiting is provided by resistor R5 coupled between node F and terminal 68. Since the "on" resistance of transistor Q1 is very low (e.g., its saturation resistance), terminal 68 is effectively "clamped" to the potential of terminal 66 whenever transistor Q1 is turned on whereby signal S4 assumes a positive potential substantially equal to Vs. In this condition, resistor R5 limits current flow to node F thereby preventing a short circuit of the Vb and Vs supplies. Since, the full potential difference between Vb and Vs appears across resistor R5, it is desirable that its resistance value be selected to be relatively high (e.g., 33K-ohms or so) so as to minimize circuit power dissipation. When transistor Q1 is off (Vs=0) the path between terminals 66 and 68 is essentially an open circuit whereupon a negative output voltage is produced at terminal 68 equal to Vb less any voltage drop appearing across resistor R5. This voltage drop is very small since in this condition the current through resistor R5 equals only the sum of the leakage currents of diodes D1-D5. As a result, essentially the full value of the reverse bias voltage Vb appears across the diodes of the transfer switch 60 thereby providing a high level of noise immunity for the switch for the reasons previously discussed.

The negative bias voltage, Vb, for unit 60 can not be obtained from supply 40 since it is required that Vb be available when switch 42 is open. Voltage Vb could be provided by a battery or by an unswitched transformer coupled power supply. Such alternatives, however, suffer several disadvantages. Batteries, for example, present problems with regards to reliability and the need for servicing. A transformer coupled power supply would be highly inefficient for reverse biasing diodes since the output power that is required for this purpose is only a few micro-watts, at most, and is substantially less than the usual excitation losses of conventional transformers (e.g., hysteresis, eddy current and copper losses). The foregoing problems are avoided in unit 60 by means of transformerless power supply in unit 60 which provides the advantage of high efficiency in this low current bias application and the further advantage of suppression of common mode and differential mode components of noise or RF signals which may be present on line conductors 52 and 54 and which is also insensitive to the polarization of the power connector 50 with respect to the source of A.C. power (i.e., either of conductors 52 and 54 may be the A.C. neutral).

In more detail, the transformerless power supply comprises capacitors C6 and C7 connected in series between terminal 64 and ground to form a first capacitive potential divider and capacitors C8 and C9 connected in series between terminal 62 and ground to form a second capacitive potential divider. Reduced A.C. output voltages are produced at output nodes X and Y of the dividers. A divider ratio of about 20:1 for an A.C. supply of nominally 120 volts has been found suitable for reverse biasing diodes D1-D5. This voltage reduction may be obtained by appropriately scaling capacitors C6-C9, representative values being 0.001 microfarad for capacitors C6 and C8 and 0.02 microfarad for capacitors C7 and C9. It is desirable that capacitors C6-C9 be of a type having a relatively low equivalent series resistance (ESR) to maximize the voltage divider efficiency and that capacitors C6 and C8 (which experience the greater portion of the A.C. voltage drop) be of a high voltage type suitable for connection directly to A.C. power distribution lines.

In addition to providing the function of A.C. line voltage reduction, the capacitive potential dividers also provide common-mode and differential-mode high frequency noise suppression for A.C. line conductors 52 and 54. Common-mode high frequency noise components which may be present on conductors 52 and 54 are coupled to ground by the respective dividers C8-C9 and C6-C7. Differential mode high frequency noise components are effectively short circuited by the series connection of capacitors C6-C9 which provides a low impedance path directly between conductors 52 and 54 at high frequencies. The effectiveness of this radio frequency interference (RFI) suppression may be enhanced by adding inductance to the line conductors 52 and 54 if desired.

The output voltages at nodes X and Y are rectified and applied to node F where the rectified voltage is stored on a capacitor C10 coupled between node F and ground. Rectification is provided by diodes D6, D7 and D8 connected in series between node F and ground with the common connection of diodes D6 and D7 coupled to node Y via a current limiting resistor R6 and the common connection of diodes D7 and D8 coupled to node X via a current limiting resistor R7. Resistors R6 and R7 provide surge current or "spike" protection for the rectifier diodes and may have values on the order of a few thousand ohms or so.

Diodes D6-D8 are all poled in the same sense with respect to ground and form, in effect, a peak-to-peak detector which makes the output voltage at node F insensitive to where the ground of the A.C. line is referenced (i.e., either of conductors 52 or 54 may be the A.C. "neutral"). For example, if conductor 54 is ground (neutral), then no A.C. voltage appears at node X and the anode of diode D8 assumes a D.C. bias one diode drop above ground. Diodes D6 and D7 then form a peak-to-peak detector of the voltage on conductor 52 divided by the voltage divider C8-C9 with the detected negative D.C. voltage appearing across capacitor C10. If, on the other hand, conductor 52 is grounded (neutral), then diodes D7 and D8 detect the divided voltage from conductor 54 and the negative bias appears at the junction of capacitors C8 and C9 and is conducted to capacitor C10 via diode D6. For cases where neither conductor 52 and 54 is at ground potential, the same D.C. output voltage (Vb) is produced at node F, namely, the peak-to-peak value of the A.C. input voltage reduced by the attenuation factor (20:1) of the potential dividers C6-C7 and C8-C9.

Having considered supply 40 and control unit 60 separately, consideration will now be given to the overall combination which provides several unique advantages. One important advantage is that the A.C. to D.C. conversion efficiency of the combination is relatively high for either condition of power switch 42. When switch 42 is open, for example, there are no exciting current losses in transformer 42 and the relatively small current required to reverse bias diodes D1-D5 is provided with high efficiency by the capacitor coupled power supply in unit 60. When switch 42 is closed, the exciting losses in transformer 44 are relatively small as compared with the total power delivered to recovery unit 10, modulator 20 and switch 30 so that the transformer overall efficiency is relatively high.

Another advantage of the combination of supply 40 and unit 60 is that the use of transformer coupling and capacitor coupling provides D.C. isolation of the player from the A.C. power lines. This allows the chassis of the player to be grounded (via the antenna connector, for example) to avoid any potential shock hazard of a so-called "hot" chassis. Also, the power plug 50 need not be polarized since one potential divider will be effective for providing the diode bias current regardless of which power conductor is assumed to be the neutral as previously explained.

In certain applications it may be desired to provide a unipolar (rather than a bipolar) output signal at terminal 68 having a relatively high current capability when switch 42 is closed and a relatively low current capability when switch 42 is open. As an example, a unipolar output signal could be used to provide standby bias to retain data in a volatile computer memory when the computer is off. A unipolar (positive) output voltage at terminal 68 may be obtained by reversing the poling of diodes D6-D8. A negative unipolar output voltage may be obtained by reversing the connections of rectifier and filter unit 46 and replacing PNP transistor Q1 with an NPN transistor.

What is claimed is:

1. A bias supply for A.C. line powered apparatus, comprising:

first and second A.C. supply lines for connection to a source of A.C. power;

first D.C. supply means having transformer means having a primary winding coupled to said supply lines via a power on-off switch and output means for providing a first D.C. output voltage when said power switch is closed;

second capacitively coupled D.C. supply means having capacitor input means continuously coupled to said supply lines and output means for continuously providing a second D.C. output voltage;

an output terminal; and circuit means for selectively coupling said D.C. output voltages to said output terminal to provide a bias output signal.

2. A bias supply for A.C. line powered apparatus, comprising:

first and second A.C. supply lines for connection to a source of A.C. power;

first D.C. supply means having transformer means coupled to said supply lines via a power switch and output means for providing a first D.C. output voltage when said power switch is closed;

second D.C. supply means having input means continuously coupled to said supply lines and output means for providing a second D.C. output voltage, said input means of said second supply means having an input impedance characteristic which varies inversely with frequency;

an output terminal;

circuit means for selectively coupling said D.C. output voltages to said output terminal to provide a bias output signal; and wherein said input means of said second supply means comprises a pair of capacitive potential dividers, each divider being coupled between a respective one of said supply lines and a common circuit node.

3. A bias supply as recited in claim 2 wherein each of said capacitive potential dividers includes an output tap for producing a divided output voltage and wherein said second supply means further comprises detector means for producing said second D.C. output voltage in response to potential development at either one of said taps.

4. A bias supply as recited in claim 3 wherein said detector means is of the peak-to-peak responding kind.

5. A bias supply as recited in claim 3 wherein said second supply means further comprises means for protecting said detector means from transient surges of the divided output voltage appearing at either of said taps.

6. A bias supply as recited in claim 3 wherein said detector means comprises a plurality of diodes connected in series between first and second plates of a capacitor, the common connection of one pair of said diodes being coupled to one of said taps, the common connection of another pair of said diodes being coupled to another of said taps.

7. A bias supply as recited in claim 2 wherein said D.C. output voltages are of opposite polarities.

8. A bias supply as recited in claim 2 wherein said circuit means includes impedance means for coupling said second D.C. output voltage to said output terminal and switch means for coupling said first D.C. output voltage to said output terminal.

9. A bias supply, comprising:

first and second A.C. supply lines for connection to a source of A.C. power;

a switched power supply means comprising a power transformer having a primary winding coupled via a power switch to said A.C. supply lines and a secondary winding coupled to rectification and filtering means for providing a D.C. output voltage of a first polarity when said power switch is in a closed condition;

an un-switched power supply means comprising a pair of capacitive potential dividers, each divider being connected between a respective one of said supply lines and a common circuit node and having an output tap, each tap being connected to potential detecting means having an output node for providing a D.C. output voltage of a second polarity in response to potential development at either of the taps; and circuit means for combining the D.C. output voltages of said switched and un-switched power supply means to produce a bias output signal.

10. A bias supply as recited in claim 9 wherein said potential detecting means comprises:
  a capacitor coupled between said output node and said common circuit node;
  first, second and third diodes connected in series between said output node and said common circuit node;
  a first resistor connected between the junction of the first and second diodes and one of said output taps; and
  a second resistor connected between the junction of the second and third diodes and the other of said output taps.

* * * * *